July 4, 1967     H. S. COHEN     3,329,103
ADJUSTABLE PALLET

Filed Jan. 27, 1966            2 Sheets-Sheet 1

INVENTOR
HOWARD S. COHEN
By:- Smart & Biggar
ATTORNEYS

United States Patent Office 3,329,103
Patented July 4, 1967

3,329,103
ADJUSTABLE PALLET
Howard S. Cohen, Montreal, Quebec, Canada, assignor to
The Howert Company Ltd., Montreal, Quebec, Canada
Filed Jan. 27, 1966, Ser. No. 523,298
21 Claims. (Cl. 108—54)

The present invention relates to a pallet unit and more particularly to a pallet unit adapted to be joined to similar pallet units to form a pallet of adjustable dimensions. The present invention also relates to the pallet so formed.

Pallets have considerable use in the transportation and storage of goods, particularly in warehouses and factories. The nature and size of goods to be stored or transported vary widely, thus necessitating pallets of various sizes. Present handling practices in factory and warehouse storage and transportation require a large inventory of pallets to be maintained to accommodate the frequently changing pallet requirement which results in increased capital costs to the manufacturer or transporter and further a large inventory of pallets requires additional storage space which results in a further cost as the space required to store the pallets could otherwise be usefully employed.

Further, pallets of fixed dimensions are only suitable for particular types and sizes of goods, thus in many cases, the pallets may only be useful for transportation of goods in one direction and have to be returned empty, and as such, further add to the transportation costs during their use. Accordingly, pallets of adjustable dimensions have heretofore been provided which may be employed with goods requiring pallets of varying dimensions.

However, such adjustable pallets that have heretofore been provided leave much to be desired and suffer from many disadvantages. These prior pallets of adjustable dimensions have relied for their adjustment on the outward telescopic movement of the side of the pallets. This places many limitations as to the maximum and minimum sizes of the pallets which may be attained and also it will be readily realized that the strength and load supporting area provided by the pallet in the telescoped position decreases with increase in size of the pallet.

In particular, in such heretofore known pallets, the minimum size of the pallet is the size of the basic pallet and the maximum size of the pallet is twice the size of the basic pallet. Thus, it is only possible to produce pallets of this telescopic structure in a particular size range and it will be readily realized that the minimum size of the pallet is conditioned to a great extent by the maximum size of the pallet.

Further, in telescoping any particular side of the pallet the supporting surface of the pallet will inherently only have longitudinal support members forming the platform and no cross members leaving huge gaps and as such the support provided by this supporting surface for the goods leaves much to be desired and limits both the weight and size of the goods that can be carried by the pallet.

The present invention provides a pallet made from a plurality of individual pallet units which has the advantage of being readily adjustable to any maximum dimension required and further has a small attainable minimum dimension that has heretofore been impossible with known pallets. Further, the pallet of the present invention has a substantially uniform supporting surface or platform which provides substantially uniform support for the goods thereon irrespective of the size of the pallet. The pallet according to the invention can be supplied and cheaply manufactured out of a very small number of different types of basic elements.

According to the present invention, therefore, there is a pallet unit in or for use with a pallet of adjustable dimensions, comprising a support tube and two parallel spaced platform tubes fixed to the top surface of the support tube and transversely of and axially perpendicular to the support tube, the cross-section of the support tube in each platform tube being rectangular and substantially identical to the cross-sectional dimensions so that each of the feed tubes can receive a connecting bar slidable and adjustably attachable within each of said tubes.

The present invention also provides a pallet of adjustable dimensions comprising a plurality of pallet units each of which comprises a support tube, at least one platform tube fixed to the top surface of the support tube transversely of the support tube and extending axially beyond the side edges of the support tube; and a plurality of connecting bars each slidable and adjustably attachable in any one of a plurality of positions within any of the support tubes and each slidable and adjustably attachable in any one of a plurality of positions within any of the platform tubes, any two axially adjacent tubes being detachably connected together by means of a connecting bar inserted into both of said last-mentioned tubes, said last-mentioned connecting bar being attached to each of said last-mentioned tubes in one of said plurality of positions.

While it is possible to use pallet units in which the platform and support tubes cross at angles other than right angles it will readily be realized that the pallets most commonly in use are of rectangular shape and thus the pallet units of the present invention desirably have the platform and support tubes crossing substantially at right angles.

In order to produce pallets from the pallet units which are capable of carrying loads of various sizes and weights and in particular loads of small size and large weight, the spaces between the first elongated members forming the platform should not be unduly large relative to the width of the members and to this end it is desirable that each support tube of the pallet unit has attached thereto a plurality of platform tubes. Further, the pallet formed from the units should be as light as possible commensurate with adequate strength for supporting the load it is destined to carry and therefore the number of support tubes on each pallet unit should be at a minimum and it has been found desirable that each pallet unit should comprise a single support tube having attached thereto a suitably spaced plurality of platform tubes. These platform tubes are usually only attached to the top of the support tube but in certain circumstances when the pallets with their loads are to be vertically stacked directly upon each other, to avoid substantial damage to the load upon which any particular pallet is resting, platform tubes are also similarly attached to the bottom of the support tube to provide a similar platform thereon. Thus in one embodiment of the present invention the single support tube has two spaced apart platform tubes on the top and bottom thereof. It is however to be stressed that although there is desirably a plurality of first elongated members attached to each second elongated member to form the pallet unit those pallet units formed from a single first elongated member attached to a single second elongated member have utility both in forming pallets themselves and have particular utility when used in conjunction with the preferred pallet units having a plurality of platform tubes attached to a single support tube so as to provide greater flexibility in the dimensions of the pallet formed therefrom while maintaining uniform distribution of the platform tubes forming the platform.

In order to provide a uniform arrangement of platform tubes forming the platform in the pallet, the outer platform tubes ars suitably spaced apart from the adjacent ends of the support tubes forming each pallet unit by a distance which is desirably substantially half and between adjacent platform tubes.

In a particularly preferred embodiment of the present invention the pallet unit comprises two platform tubes forming a platform of said pallets and one support tube forming a support for said platform, said platform tubes being fixably attached to and extending transversely at an angle of substantially 90 degrees across the top and beyond the edges of the support tube, said platform tubes being spaced apart substantially parallel and spaced from adjacent ends of said support tube a distance which is substantially half the distance between the platform tube and said platform and support tubes being adapted to be detachably rigidly attached to corresponding platform and support tubes of another of said units to form a pallet.

The platform and support tubes are adapted to be detachably rigidly attached to corresponding tubes in other pallet units to form the pallet suitably by means of a connecting member adapted to be detachably attached to and extend between corresponding platform and support tubes. Desirably the connecting member is a connecting bar, the opposite ends of which are accommodated in corresponding platform and support tubes, means being provided for removably rigidly fixing the ends of the bar in each of said platform and support tubes. In this direction the platform and support tubes are hollow which has the advantage of, besides allowing for receipt of the connecting bar also reduces the weight of the pallet unit and thus the pallet. In order to provide rigidity in the pallet formed from the pallet unit and connecting bar desirably has a slidable fit in the ends of the first platform and support tubes and the ends of the bar are suitably removably held therein by means of pins extending transversely through holes in the connecting bar and the platform and support tubes.

The platform and support tubes and the connecting bars which are also desirably hollow are suitably rectangular in cross-section and in the interest of uniformity of pallet units in the pallet each support tube bisects the platform tube desirably with a short side of the support tube attached e.g. welded to a long side of each platform tube and with this arrangement the holes present for the receipt of the holding pins are in the long sides of the platform and support tubes.

The platform and support tubes and the connecting bars are suitably formed from rigid materials such as metal, fiber or natural or synthetic resins. A particularly suitable material is steel or light weight alloys, the latter being very desirable as they provide strength to the pallet with a minimum of weight. The present invention will be further illustrated by way of the accompanying drawings in which.

Figure 1:
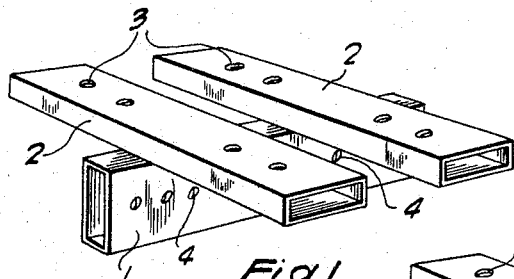
FIGURE 1 is a perspective view of a pallet unit according to one embodiment of the present invention.

Referring firstly to FIGURE 1 the pallet unit comprises a hollow support tube 1 of rectangular cross-section having welded thereto a spaced pair of parallel hollow platform tubes 2 also of rectangular cross-section which are bisected by the support tube 1 and which are spaced from the adjacent ends of the second support tube 1 by a distance equal to substantially half the distance between the platform tubes 2. The platform tubes 2 have holes 3 extending transversely therethrough and the support tube 1 also has holes 4 extending transversely therethrough.

Figure 2:
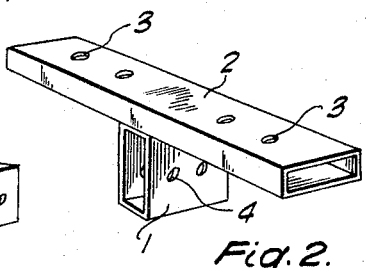
FIGURE 2 is a perspective view of a pallet unit according to another embodiment of the present invention.

Turning now to FIGURE 2 the pallet unit comprises a single platform tube 2 having transverse holes 3 extending therethrough, the said platform tube 2 being welded to a support tube 1 also having transverse holes 4 extending therethrough. With this pallet unit, however, the platform tube 2, although extending across and being bisected by the support tube, 1, lies flush with the ends of the support tube.

Figure 3:
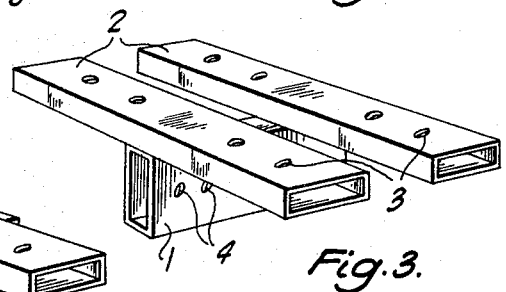
FIGURE 3 is a perspective view of a pallet unit according to yet a further embodiment of the present invention.

With reference to FIGURE 3 this pallet unit is precisely the same as the pallet unit of FIGURE 1 except that the platform tubes 2 lie flush with the ends of the support tube 1.

Figure 4:
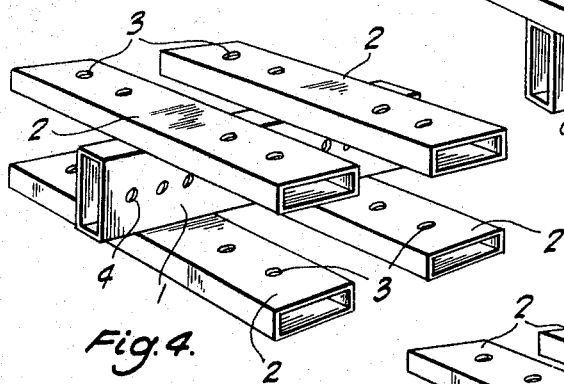
FIGURE 4 is a perspective view of a pallet unit according to another embodiment of the present invention.

With regard to the pallet unit of FIGURE 4 this again is similar to the pallet unit of FIGURE 1 except that it has similar platform tubes 2 attached to the bottom as well as the top of the support tube 1.

Figure 5:
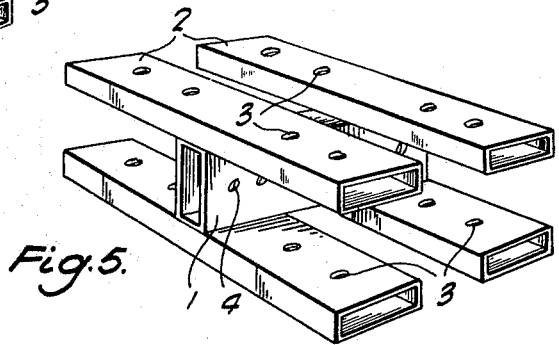
FIGURE 5 is a perspective view of a pallet unit according to yet another embodiment of the present invention

The pallet unit of FIGURE 5 is similar to the pallet unit of FIGURE 3 except that again it has platform tubes 2 attached to the top and bottom of the support tube 1.

Figure 6:
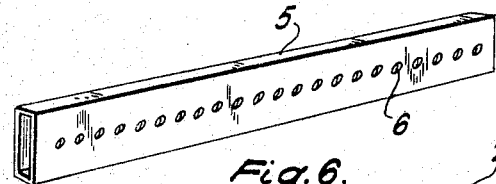
FIGURE 6 is a perspective view of a connecting bar for use in joining the pallet units of FIGURES 1 to 5 to form a pallet and FIGURE 7 is a plan view of part of a pellet formed from the pallet units of FIGURES 1 and 2.

Turning now to FIGURE 6 the connecting bar 5 is hollow and of rectangular cross section and has a plurality of holes 6 spaced thereon the bar 5 being dimensioned so as to have a slidable fit within both the platform and support tube 1 of the pallet units.

Figure 7:
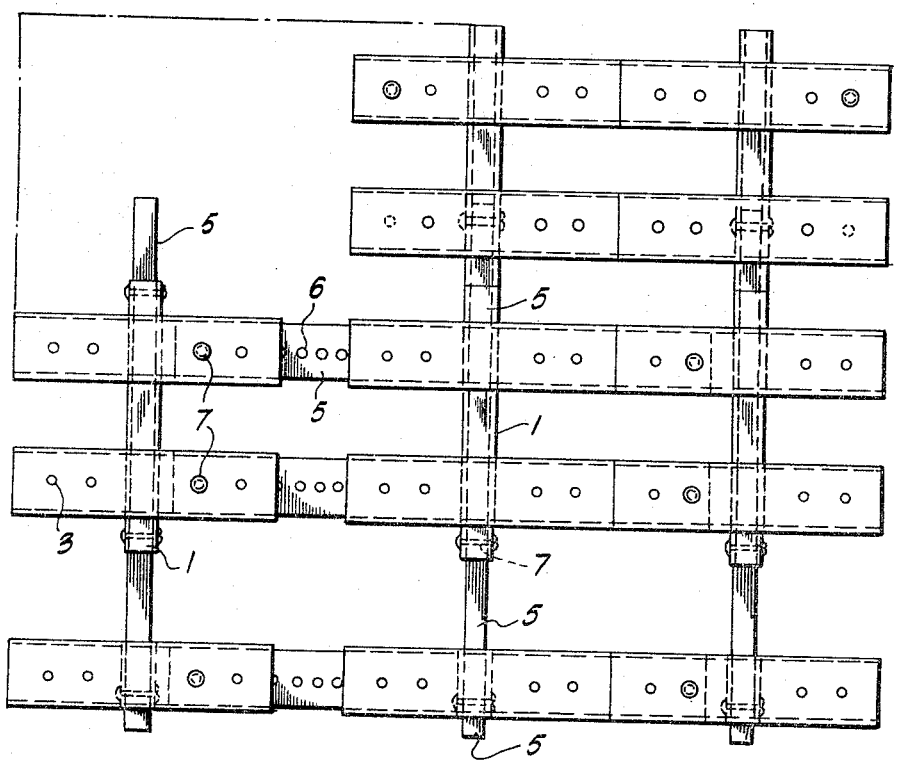

Turning now to FIGURE 7 the pallet as will be readily seen is formed from a plurality of units as previously described. The particular pallet of FIGURE 7 is composed of pallet units of FIGURES 1 and 2, interconnected using connecting bars 5 of the type shown in FIGURE 6.

As will be seen from FIGURE 7 in forming the pallet each pallet unit is disposed adjacent similar pallet units with the support and platform tubes 1 and 2 adjacent similar support and platform tubes 1 and 2 respectively. The pallet units are joined to each other by means of the connecting bars 5 which extend therebetween with a slidable fit therein and the connecting bars are detachably rigidly held therein by means of removable pins 7.

It will be readily seen from FIGURE 7 that a pallet of adjustable dimensions can be readily made from the pallet units of the present invention there being no limit on the size of the pallet than can be made and that the supporting platform formed by the platform tubes 2 is substantially uniform (i.e., adjacent parallel platform tubes need never be spaced unduly widely apart) no matter how large the pallet is constructed. Thus the size of the pallet formed by the joining of the pallet unit may be altered by simply adding or removing pallet units from the pallet structure until the pallet of the desired dimensions is constructed without there being any large gaps in the platform formed by the platform tubes 2.

In a suitable pallet unit according to the present invention both the platform and support tubes are twelve inches in length, three and a half inches in width and one and a quarter inches in thickness, the distance between the platform tubes is three inches and the distance between the platform tubes and the ends of the support tube is one and a half inches. Further, the holes in the platform and connecting bars are suitably spaced two inches apart and the holes in the connecting bars are spaced one inch apart.

What I claim as my invention is:
1. A pallet of adjustable dimensions comprising:
(1) a plurality of pallet units each of which comprises a support tube, a platform tube fixed to the top surface of the support tube transversely of the support tube and extending axially beyond the side edges of the support tube; and
(2) a plurality of connecting bars each slidable and adjustably attachable in any one of a plurality of positions within any of the support tubes and each slidable and adjustably attachable in any one of a plurality of positions within any of the platform tubes, any two axially adjacent tubes being detachably connected together by means of a connecting bar inserted into both of said last-mentioned tubes, said last-mentioned connecting bar being attached to each of said last-mentioned tubes in one of said plurality of positions.

2. A pallet as defined in claim 1 wherein the interior cross-sectional dimensions of all of the support tubes are substantially the same, and the interior cross-sectional dimensions of all of the platform tubes are substantially the same.

3. A pallet as defined in claim 2, wherein the outer cross-sectional dimensions of each of the connecting bars are the same as or slightly smaller than the interior cross-sectional dimensions of the platform tubes and of the support tubes.

4. A pallet as defined in claim 3, wherein the cross-sectional dimensions of each of the support tubes are substantially identical to the cross-sectional dimensions of each of the platform tubes.

5. A pallet as defined in claim 4, wherein the cross-section of each of the platform tubes and support tubes is rectangular.

6. A pallet as defined in claim 5, wherein at least some of the pallet units each additionally comprises a second platform tube of rectangular cross-sectional dimensions substantially identical to the first platform tube and transversely fixed to the top surface of the support tube and spaced from and parallel to the first platform tube.

7. A pallet as defined in claim 6, wherein all the platform tubes have substantially the same length, and all the support tubes have substantially the same length.

8. A pallet as defined in claim 7, wherein the platform tubes have at least approximately the same length as the support tubes.

9. A pallet as defined in claim 8, wherein each connecting bar is of the order of twice the length of each support tube.

10. A pallet as defined in claim 9, wherein the support tubes, platform tubes and connecting bars are provided with similarly regularly spaced holes along their sides through which attaching means may be inserted, and wherein any two axially adjacent support tubes and any two axially adjacent platform tubes are interconnected by means of at least two of said attaching means, one of which means engages a hole in one of two of said adjacent tubes and a hole in a connecting bar within both said adjacent tubes, and the other of which means engages a hole in the other of the two adjacent tubes and another hole in the last-mentioned connecting bar.

11. A pallet as defined in claim 10, wherein the said holes are provided in the horizontal sides of the platform tubes and in the vertical sides of the support tubes.

12. A pallet as defined in claim 11, wherein a short side of each support tube is fixed to a long side of each platform tube to which said last-mentioned support tube is attached.

13. A pallet as defined in claim 12, wherein each supported tube is fixed substantially midway between the ends of each platform tube to which said last-mentioned support tube is attached.

14. A pallet as defined in claim 13, wherein at least four platform tubes are fixed in spaced opposite pairs on the top and bottom of each of at least some of the support tubes.

15. A pallet unit in or for use with a pallet of adjustable dimensions, comprising a support tube and two parallel spaced platform tubes fixed to the top surface of the support tube and transversely of and axially perpendicular to the support tube, the cross-section of the support tube and each platform tube being rectangular and of substantially identical cross-sectional dimensions so that each of said tubes can receive a connecting bar slidable and adjustably attachable within each of said tubes.

16. A pallet unit as defined in claim 15, wherein the platform tubes are substantially identical.

17. A pallet unit as defined in claim 16, wherein each platform tube has substantially the same axial length as the support tube.

18. A pallet unit as defined in claim 17, wherein the support tube and platform tubes are provided with similarly regularly spaced holes along their sides.

19. A pallet unit as defined in claim 18, wherein the holes are provided in the horizontal sides of the platform tubes and in the vertical sides of the support tube.

20. A pallet unit as defined in claim 19, wherein the short side of the support tube is fixed to the long side of each of the platform tubes.

21. A pallet unit as defined in claim 20, wherein two oppositely spaced pairs of platform tubes are fixed on the top and bottom of the support tube.

References Cited

UNITED STATES PATENTS

| | | | |
|---|---|---|---|
| 2,405,535 | 8/1946 | Weiss | 108—54 |
| 2,410,330 | 10/1946 | Ashenfelter | 108—53 X |
| 2,450,432 | 10/1948 | Lehrman | 108—57 |
| 2,739,776 | 3/1956 | Terando | 108—54 |
| 2,873,934 | 2/1959 | Settles | 108—54 |
| 2,909,349 | 10/1959 | Morris | 108—54 |
| 2,909,350 | 10/1959 | Morris | 108—54 |
| 2,972,463 | 2/1961 | Matthews et al. | 108—54 |
| 3,022,028 | 2/1962 | Reinhard et al. | 108—56 X |
| 3,107,635 | 10/1963 | Kaiser | 108—51 |
| 3,165,078 | 1/1965 | White | 108—56 |

FOREIGN PATENTS

| | | |
|---|---|---|
| 1,163,734 | 2/1964 | Germany. |
| 895,694 | 5/1962 | Great Britain. |

DAVID J. WILLIAMOWSKY, *Primary Examiner.*

FRANK B. SHERRY, *Examiner.*

G. O. FINCH, *Assistant Examiner.*